United States Patent
Liu et al.

(10) Patent No.: US 11,892,471 B2
(45) Date of Patent: Feb. 6, 2024

(54) METHOD AND DEVICE FOR SIMULTANEOUS INDEPENDENT MOTION MEASUREMENT OF MULTIPLE PROBES IN ATOMIC FORCE MICROSCOPE

(71) Applicant: SHENYANG INSTITUTE OF AUTOMATION, CHINESE ACADEMY OF SCIENCES, Liaoning (CN)

(72) Inventors: Lianqing Liu, Liaoning (CN); Jialin Shi, Liaoning (CN); Peng Yu, Liaoning (CN)

(73) Assignee: SHENYANG INSTITUTE OF AUTOMATION, CHINESE ACADEMY OF SCIENCES, Liaoning (CN)

( * ) Notice: Subject to any disclaimer, the term of this patent is extended or adjusted under 35 U.S.C. 154(b) by 0 days.

(21) Appl. No.: 17/757,328

(22) PCT Filed: May 8, 2021

(86) PCT No.: PCT/CN2021/092278
§ 371 (c)(1),
(2) Date: Jun. 14, 2022

(87) PCT Pub. No.: WO2022/057276
PCT Pub. Date: Mar. 24, 2022

(65) Prior Publication Data
US 2023/0020068 A1    Jan. 19, 2023

(30) Foreign Application Priority Data

Sep. 16, 2020 (CN) .......................... 202010973495.1

(51) Int. Cl.
*G01Q 20/02* (2010.01)
*G01Q 60/38* (2010.01)

(52) U.S. Cl.
CPC ............ *G01Q 20/02* (2013.01); *G01Q 60/38* (2013.01)

(58) Field of Classification Search
CPC ...................................................... G01Q 20/02
See application file for complete search history.

(56) References Cited

U.S. PATENT DOCUMENTS

| 5,908,981 A | 6/1999 | Atalar et al. |
| 10,197,595 B2 * | 2/2019 | Su .......................... G01Q 10/00 |

(Continued)

FOREIGN PATENT DOCUMENTS

| CN | 104965105 A | 10/2015 |
| JP | H11142421 A | 5/1999 |
| KR | 20080110234 A | 12/2008 |

*Primary Examiner* — Eliza W Osenbaugh-Stewart
(74) *Attorney, Agent, or Firm* — NKL Law; Allen Xue

(57) ABSTRACT

A device capable of simultaneous independent motion measurement of multiple probes in an atomic force microscope includes at least two cantilever arms arranged in parallel. The end of each cantilever arm is provided with a needle tip. The surface of each cantilever arm is provided with a grating structure with a periodic distribution rule for reflecting laser irradiated on the grating structure and receiving the laser through reflected light detectors. The discrimination and motion measurement includes the steps of irradiating the measurement laser of different wavelengths on the back surfaces of multiple probes through the same light path at the same time, adopting the grating structures of different feature sizes as physical labels of the multiple probes and reflecting high-order reflected light of the laser of different wavelengths by the grating structures at different angles to separate the light path.

8 Claims, 5 Drawing Sheets

(56) References Cited

U.S. PATENT DOCUMENTS

2006/0072185 A1\* 4/2006 Proksch ................ G01Q 70/06
359/293
2020/0025796 A1\* 1/2020 Matejka ............... G01Q 10/065

\* cited by examiner

METHOD AND DEVICE FOR SIMULTANEOUS INDEPENDENT MOTION MEASUREMENT OF MULTIPLE PROBES IN ATOMIC FORCE MICROSCOPE

TECHNICAL FIELD

The present invention relates to a method and device for realizing simultaneous independent motion measurement of multiple probes in an atomic force microscope by taking grating structures as physical labels, and particularly to multiple probes in an atomic force microscope having the grating structure and a method and device thereof for simultaneous independent motion measurement to realize interference-free simultaneous motion measurement of multiple probes with ultra-short distance. The present invention is mainly used for various fields of multi-point simultaneous imaging and detection of morphology, mechanics, electricity, chemistry and life science with nanoscale spatial resolution.

BACKGROUND

A typical atomic force microscope system can measure the interaction between a needle tip and a sample by using a flexible probe including a micron cantilever beam and a nanometer needle tip. The principle is as follows: the laser is irradiated to the flexible cantilever beam through an emitter, the back of the cantilever beam can reflect the laser well, and the reflected laser is irradiated on a photoelectric position sensitive detector. The interaction between the needle tip and the sample makes the flexible cantilever beam bend to a certain extent, which will cause the change of the position of a reflected laser spot on the photoelectric position sensitive detector to change, so as to detect the bending value of the cantilever beam. The atomic force microscope system conducts control of scanning imaging, measurement of mechanical information and feedback of nano-control signals according to the bending value of the cantilever beam as an input signal.

The above typical atomic force microscope system has only one probe, and thus can only conduct measurement and operation at a single point. However, many application occasions require simultaneous measurement, imaging and control at multiple points, so a multi-probe technology based on multi-probe collaboration is needed to compensate. For example, measurement of the conduction process of signals of mechanics or electricity requires measuring at least two points on a conduction path simultaneously. When the measurement points are close (below 2 microns), it is difficult for the typical atomic force microscope system to achieve simultaneous measurement at multiple points, and two probes are needed for simultaneous measurement. For example, when a functional probe is used for mechanical, biological or chemical control and the other probe is used for real-time response measurement, the two probes are needed to realize independent coordinated control and measurement functions.

At present, the traditional independent motion measurement method of multiple probes is mainly used to integrate multiple sets of independent atomic force microscope systems, so that the distance of multiple probes is close enough to make the working spaces coincide, so as to achieve the purpose of cooperative measurement and control of multiple probes. Due to different arrangement directions and angles of the multiple probes, respective measurement light paths can be separated to realize simultaneous independent motion measurement of the multiple probes. However, the system with multiple measurement light paths not only has high cost, but also requires the probes to be arranged at different angles and positions. Coordinated control is difficult (a firing pin phenomenon may occur) when the probes are close to each other. Many problems are practically insurmountable in practical application and commercialization, so there is still a lack of mature multi-system-based systems for collaborative control and measurement of the multiple probes.

Another collaborative measurement and control method of multiple probes is to manufacture multiple probes on the same base, arrange the multiple probes in a minimal distance and the same angle and direction, and integrate a deformation sensor, such as a piezoelectric strain gauge and a temperature sensor, on the cantilever beam of the probes to achieve simultaneous independent motion position measurement. Although the method can realize the function of independent driving and measurement of double probes, the method still has the following disadvantages: 1. The method has special requirements for samples and working environment, and cannot be applied to liquid, biological and non-conductive samples, and the working environment and measurement objects are limited; and 2. the structure of the probe is complex, advanced imaging control modes (such as peak force tapping mode) cannot be applied in mechanical properties, and functions are limited.

To sum up, a method and device that can use the traditional optical measurement method to realize simultaneous independent motion measurement of multiple probes with ultra-short distance are needed.

SUMMARY

A technical problem to be solved by the present invention is a method for simultaneous independent motion measurement of multiple probes with ultra-short distance and parallel arrangement.

To solve the above technical problem, the present invention adopts the following technical solution:

a device for simultaneous independent motion measurement of multiple probes in an atomic force microscope comprises at least two cantilever arms arranged in parallel on probe bases, and the end of each cantilever arm is provided with a needle tip;

the surface of each cantilever arm is provided with a grating structure with a periodic distribution rule for reflecting laser irradiated on the grating structure and receiving the laser through reflected light detectors.

The surfaces of the at least two cantilever arms are located in the same plane, and the distance between the two adjacent cantilever arms is less than 10 microns.

In the same cantilever arm, the grating structure has the same feature sizes, i.e., grating width is equal and the distance between gratings is equal.

The feature sizes of the grating structures in different cantilever arms are different.

A device for simultaneous independent motion measurement of multiple probes in an atomic force microscope also comprises at least two reflected light detectors; the reflected light detectors are arranged on a reflected light path through which the laser is irradiated on the surface of a cantilever arm; each reflected light detector corresponds to one cantilever arm.

Light filters are arranged in front of the reflected light detectors; and the central wavelengths of the light filters arranged in front of different reflected light detectors are different to filter the interference of other reflected light sources of the cantilever beams.

The reflected light detectors are position sensitive detectors.

The wavelengths of the laser correspond to the feature sizes of the grating structures on the surfaces of the cantilever beams, i.e., after the laser of the wavelength is reflected by the grating structure with the corresponding feature size, first-order reflection is generated, and a reflection angle corresponds to a preset light path angle.

The first-order reflection of different grating structures has different reflection angles.

A method for simultaneous independent motion measurement of multiple probes in an atomic force microscope comprises the following steps:

irradiating the laser of different wavelengths on at least two cantilever beams through the same light path, and forming reflected light of different reflection angles through the grating structures on the surfaces of the cantilever beams;

for each reflected light detector, filtering the interference of reflected light sources of other cantilever beams by the corresponding light filter, so that a plurality of reflected light detectors receive the laser of different wavelengths respectively to detect the motion of the cantilever beams and realize the measurement of simultaneous motion or independent motion of a plurality of cantilever beams.

The present invention has the following beneficial effects:

1. A set of light path system in the present invention realizes the discrimination and motion measurement of multiple probes with ultra-short distance. The specific method comprises: irradiating the measurement laser of different wavelengths on the back surfaces of multiple probes through the same light path at the same time, adopting the grating structures of different feature sizes as physical labels of the multiple probes and reflecting high-order reflected light of the laser of different wavelengths by the grating structures at different angles, so as to achieve the purpose of separating the light path.

2. The present invention adopts the principle of an optical lever to realize multi-probe motion measurement, and has no special requirement for the working environment of the probes, so the present invention can be operated in atmosphere and liquid environments.

Figure 3:
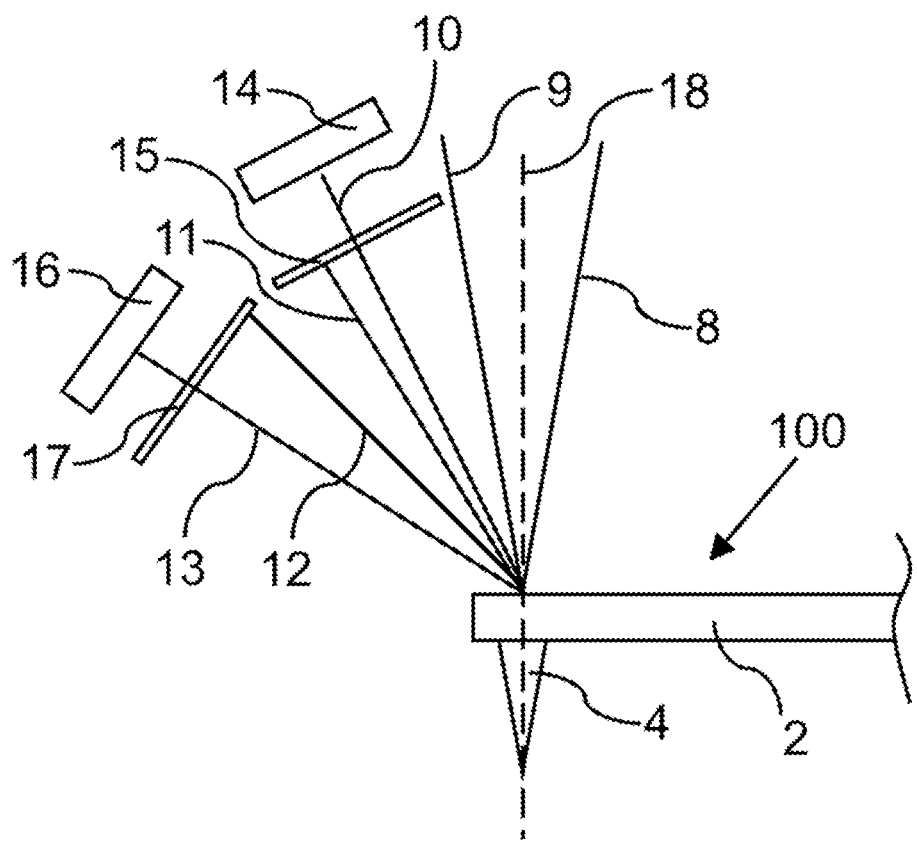
Figure 4:
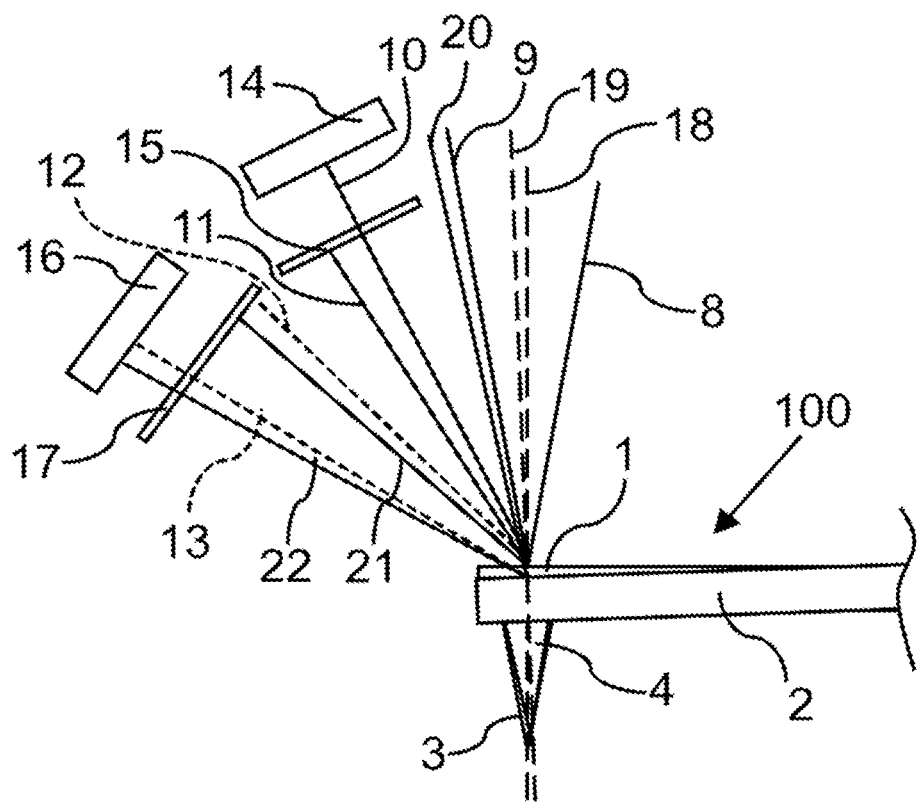
Figure 5:
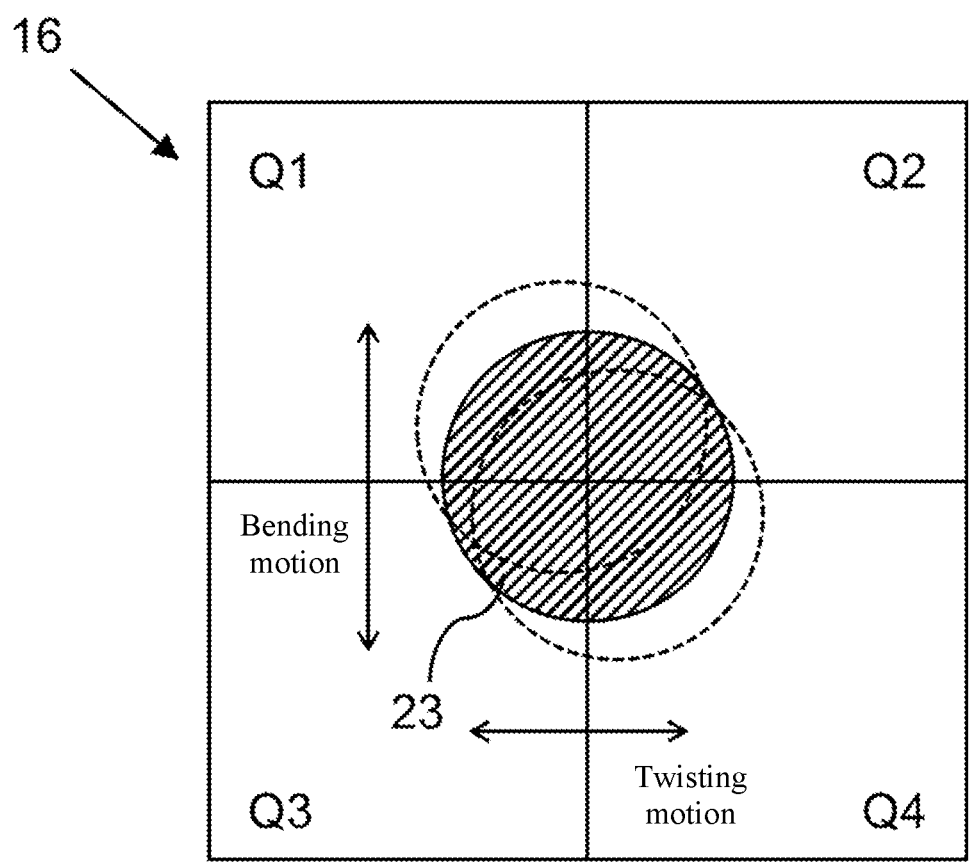

wherein 100 represents multiple probes that use grating structures of different feature sizes as physical labels; 1 and 2 are two cantilever beams respectively; 3 and 4 are needle tips of free ends of the cantilever beams 1 and 2 respectively; 5 and 6 are grating lines on the back surfaces of the cantilever beams 1 and 2 respectively; the grating lines 5 and 6 have periodic distribution rule; the distance of the lines 5 is a1; the distance of the lines 6 is a2; 7 is a laser spot irradiated on the back surfaces of the cantilever beams; and laser is mixed laser of different wavelengths;

FIG. 3 shows a schematic diagram of a measuring light path when multiple probes are stationary;

wherein 8 is an incident light path of mixed laser of different wavelengths; the wavelengths of the laser correspond to the feature sizes of grating structures on the back surface of a plurality of cantilever beams; 9 is a zero-order reflected light path after incident mixed laser is irradiated on the plurality of cantilever beams with different grating structures; 10 is a first-order reflected laser light path corresponding to the grating structure 5 on the back surface of the cantilever beam 1; 11 is the first-order reflected light path of laser corresponding to the cantilever beam 2 but after irradiated on the grating structure 5 on the back surface of the cantilever beam 1; 12 is the first-order reflected light path of laser corresponding to the cantilever beam 1 but after irradiated on the grating structure 6 on the back surface of the cantilever beam 2; 13 is the first-order reflected laser light path corresponding to the grating structure 6 on the back surface of the cantilever beam 2; 14 is a position sensitive detector of the laser corresponding to the cantilever beam 1; 15 is a light filter used for filtering corresponding laser of the cantilever beam 2 but can pass through the corresponding laser of the cantilever beam 1; 16 is a position sensitive detector of the laser corresponding to the cantilever beam 2; 17 is a light filter used for filtering corresponding laser of the cantilever beam 1 but can pass through the corresponding laser of the cantilever beam 2; and 18 is a normal line perpendicular to the cantilever beams 1 and 2;

FIG. 4 is a schematic diagram 1 of a method for simultaneous independent motion measurement of multiple probes: and FIG. 5 is a schematic diagram 2 of a method for simultaneous independent motion measurement of multiple probes.

Wherein 19 is a normal line perpendicular to the cantilever beam 2 after the cantilever beam 2 moves downward; 20 is a zero-order reflected light path of laser irradiated on the grating structure on the back surface of the cantilever beam 2; 21 and 22 are reflected light paths of light paths 12 and 13 after moving on the cantilever beam 2; and 23 is a laser spot on the position sensitive detector 16.

DETAILED DESCRIPTION

The present invention will be further described in detail below in combination with the drawings and the embodiments.

The present invention relates to a method and device for simultaneous independent motion measurement of multiple probes in an atomic force microscope by taking grating structures as physical labels. The grating structures of different feature sizes on the back surfaces of a plurality of cantilever beams of multiple probes are taken as the physical labels of different probes. An optical lever measurement method is used for simultaneous independent motion measurement of the multiple probes. The laser of different wavelengths is irradiated on multiple cantilever beams through the same light path, and high-order reflected light of different reflection angles is formed through the grating structures on the back surfaces of the cantilever beams; light filters are arranged in front of position sensitive detectors and can filter the interference of reflected light sources of other cantilever beams and finally irradiate the light onto the corresponding position sensitive detector (PSD) to realize simultaneous independent motion measurement of multiple probes. Independent motion control of multiple probes, assisted by a multi-probe measurement method, can realize simultaneous measurement and imaging, and collaborative control and measurement at multiple points.

The multi-probe detection technology based on atomic force microscope technology in the present invention includes at least a probe 1 and a probe 2; the probe 1 and the probe 2 measure reflection gratings 1 and 2 with different characteristic parameters on light reflecting surfaces; the first-order reflection of the grating 1 and the grating 2 has different reflection angle 1 and reflection angle 2; reflected light detectors 1 and 2 corresponding to the probe 1 and the probe 2 are in different spatial positions; and the probe 1 and the probe 2 can realize simultaneous measurement and individual control.

Figure 1:
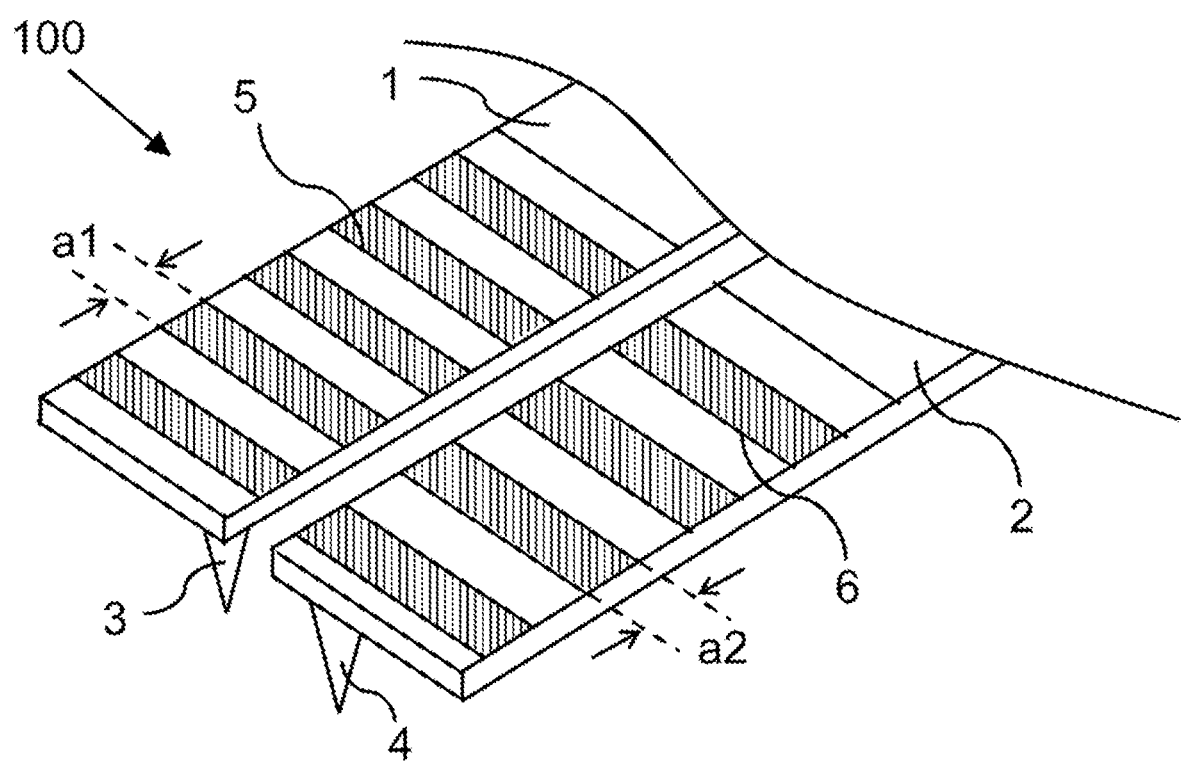
FIG. 1 is a schematic diagram of a multi-probe structure which uses grating structures of different feature sizes as physical labels in the present invention.

As shown in FIG. 1, multiple probes 100 of the present invention are composed of cantilever beams 1 and 2, needle tips 3 and 4 of the free ends of the cantilever beams, and grids 5 and 6 on the back surfaces of the cantilever beams. The cantilever beams 1 and 2 are parallel and in the same plane in a stationary state, and have a distance within 10 microns. The back surfaces of the cantilever beams 1 and 2 have grids 5 and 6 respectively which have feature sizes (distances) a1 and a2 as physical labels of the cantilever beams. The cantilever beams 1 and 2 can have different sizes and mechanical properties, and the needle tips 3 and 4 can also have different sizes and material properties.

Figure 2:
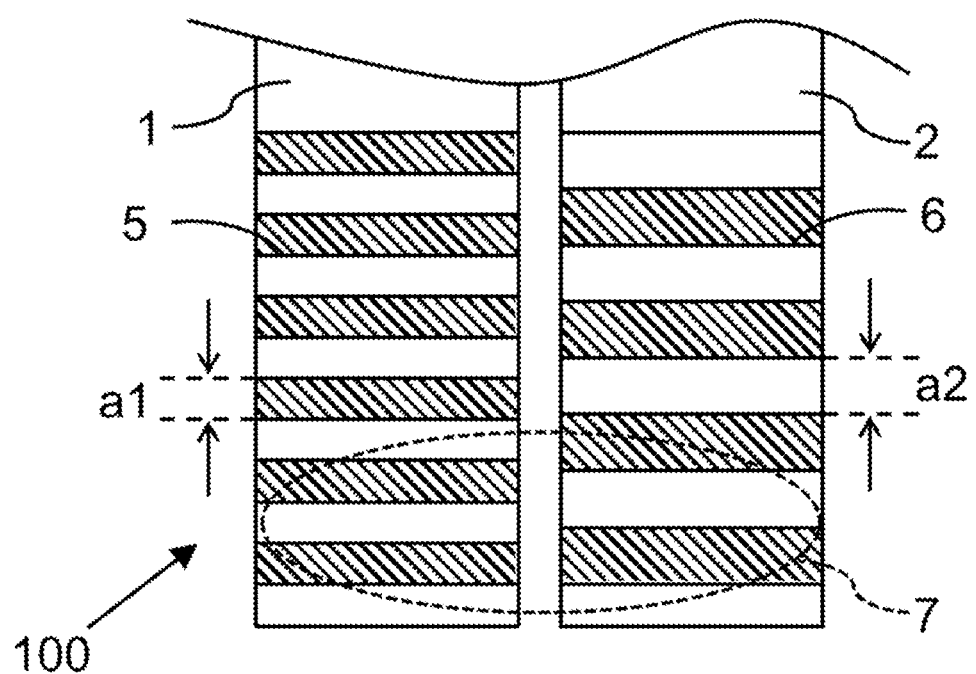
FIG. 2 is a top view of FIG. 1.

As shown in FIG. 2, the laser of different wavelengths is irradiated on the cantilever beams 1 and 2 at the same time through the same light path, to form overlapping laser spots 7.

FIG. 3 to FIG. 5 show embodiments of a method for independent motion measurement of multiple probes in the present invention. As shown in FIG. 3, two incident laser beams have wavelengths of 532 nm and 670 nm respectively, and are irradiated on the cantilever beams 1 and 2 through the same light path 8. The grids on the back surfaces of the cantilever beams 1 and 2 have feature sizes (distances) of 2 microns and 1 micron. The cantilever beams 1 and 2 are in a stationary state, and the surfaces of the two cantilever beams are in the same plane. The angle between the laser light path 8 and a cantilever beam normal line 18 is 10 degrees. The formula of the reflection angle of a diffraction grating is $\beta = \arcsin(\sin \alpha - m\lambda/a)$ where $\alpha=10°$ is an angle between the incident laser light path 8 and the normal line 18, $\lambda$ is the wavelength of incident laser, m is the order of reflected laser, a is the grating feature size (distance), and $\beta$ is an angle of an m-order reflected laser light path and the normal line 18. In the present embodiment, the feature sizes of the grids on the cantilever beams 1 and 2 are a1=2000 nm and a2=1000 nm respectively, and the measured laser wavelengths corresponding to the cantilever beams 1 and 2 are $\lambda_1$=532 nm and $\lambda_2$=670 nm respectively. The first-order (m=−1) reflected light paths on opposite sides of the incident light path 8 are 10, 11, 12 and 13. The reflected light paths 10 and 11 correspond to the first-order reflection of the laser with wavelengths of $\lambda_1$ and $\lambda_2$ on the cantilever beam 1 (with grid feature size of a1=2000 nm) respectively, and the reflected light paths 12 and 13 correspond to the first-order reflection of the laser with wavelengths of $\lambda_1$ and $\lambda_2$ on the cantilever beam 2 (with grid feature size of a1=1000 nm) respectively. The angles between the reflected light paths 10, 11, 12 and 13 and the normal line 18 are $\beta_{10}$=26.08°, $\beta_{11}$=30.57°, $\beta_{12}$=44.88° and $\beta_{13}$=57.53° respectively; the light path 10 and the light path 11 are in one group, and the light path 12 and the light path 13 are in one group; and the angle difference between the two groups of laser light paths can reach more than 20°, which can be distinguished by the spatial positions of the PSDs 15 and 16. That is, the light paths 10 and 11 are irradiated on the PSD 15, and the light paths 12 and 13 are irradiated on the PSD 16 without mutual interference. The light filter 15 filters the laser with the wavelength of $\lambda_2$=670 nm and passes through the laser with the wavelength of $\lambda_1$=532 nm, and only the laser 10 with the wavelength of $\lambda_1$=532 nm reflected through the cantilever beam 1 is irradiated on the PSD 15. The light filter 17 filters the laser with the wavelength of $\lambda_1$=532 nm and passes through the laser with the wavelength of $\lambda_2$=670 nm, and only the laser 13 with the wavelength of $\lambda_2$=670 nm reflected through the cantilever beam 2 is irradiated on the PSD 16. That is, the laser light path 10 detected by the PSD 14 is only related to the cantilever beam 1, and the laser light path 13 detected by the PSD 16 is only related to the cantilever beam 2. As shown in FIG. 4, when the cantilever beam 1 is stationary and the cantilever beam 2 moves downward, a deflection angle is generated between the cantilever beam 2 and the horizontal direction. In the present embodiment, the cantilever beam 2 deflects downward by 2° so that the normal line 19 of the cantilever beam 2 differs from the normal line 18 of the cantilever beam 1 by 2°. The first-order reflected light path of the laser irradiated on the cantilever beam 2 is changed accordingly, and the light paths 12 and 13 in the stationary state of the cantilever beam 2 are changed into the light paths 21 and 22 respectively. According to the formula of the reflection angle of the diffraction grating, the deflection angles of the light paths 21 and 22 relative to the normal line 18 can be calculated as $\beta_{21}$=49.72° and $\beta_{22}$=63.39°.

As shown in FIG. 5, 23 is the laser spot formed when the light path 13 is irradiated on the PSD 16, and the PSD can detect the position change of the spot 23 on four-quadrant PSD 16 in real time. When the cantilever beam 2 moves, the light path 13 becomes the light path 22, and the spot 23 on the PSD 16 is also changed, so as to detect the motion of the cantilever beam 2. By using the method of the patent invention, the motion of up-down bending and left-right twisting of the cantilever beams can be detected. Therefore, the motion of the cantilever beam 2 can be detected according to the position change of the laser light path 13 on the PSD 16. Similarly, the motion of the cantilever beam 1 can be detected according to the position change of the laser light path 10 on the PSD 14. Moreover, the detection results of the PSDs 14 and 16 are independent without mutual interference, thereby realizing simultaneous independent motion measurement of the multiple probes.

The invention claimed is:

1. A device for simultaneous independent motion measurement of multiple probes in an atomic force microscope, comprising:
   at least two cantilever arms that are parallelly arranged, each cantilever arm having a needle tip affixed thereto, a surface of each cantilever arm comprising a grating structure having periodically distributed rulings for reflecting laser irradiated on the grating structure;
   a plurality of light detectors, each configured to receive light reflected by one of the at least two cantilever arms; and
   a plurality of light filters, each filter disposed in a path of the reflected light to filter interference from reflected light from the at least two cantilever arms so that only light reflected from one of the at least two cantilever arms reaches one of the plurality of light detectors, wherein each light filter has a central wavelength and the center wavelengths are different from one another.

2. The device according to claim 1, wherein the surfaces of the at least two cantilever arms are adjacent to each other and located in a same plane, and a distance between the two adjacent cantilever arms is less than 10 microns.

3. The device according to claim 1, wherein each ruling in the grating structure of a cantilever arm has a same width.

4. The device according to claim 1, wherein the grating structures of different cantilever arms have rulings that are of different width from each other.

5. The device according to claim 1, wherein each of the plurality of light detectors is disposed in the path of the light beam reflected by one of the at least two cantilever arms.

6. The device according to claim 1, wherein each of the plurality of reflected light detectors is a position sensitive detector.

7. The device according to claim 1, wherein every two adjacent rulings of the grating structure have a gap disposed therebetween, and all gaps of the grating structure have a same width.

8. A method for simultaneous independent motion measurement of multiple probes in an atomic force microscope, comprising: irradiating a laser beam having more than one wavelengths on at least two cantilever beams through a same light path, each cantilever beam having a grating structure disposed on a surface of the cantilever beam;
forming more than one reflected light beams of different reflection angles by reflecting from grating structures of the at least two cantilever beams;
filtering each of the more than one reflected light beams using a corresponding light filter to allow reflected light beams from one of the at least two cantilever beams to enter a corresponding light detector, thereby detecting motions of each of the at least two cantilever beams.

* * * * *